(12) United States Patent
Orii et al.

(10) Patent No.: US 12,092,221 B2
(45) Date of Patent: Sep. 17, 2024

(54) LUBRICANT SEALING STRUCTURE, STRAIN WAVE GEARING, AND ACTUATOR

(71) Applicant: HARMONIC DRIVE SYSTEMS INC., Tokyo (JP)

(72) Inventors: Daisuke Orii, Azumino (JP); Syuhei Kobayashi, Azumino (JP)

(73) Assignee: HARMONIC DRIVE SYSTEMS INC., Tokyo (JP)

( * ) Notice: Subject to any disclaimer, the term of this patent is extended or adjusted under 35 U.S.C. 154(b) by 134 days.

(21) Appl. No.: 17/908,628

(22) PCT Filed: Jun. 5, 2020

(86) PCT No.: PCT/JP2020/022359
§ 371 (c)(1),
(2) Date: Sep. 1, 2022

(87) PCT Pub. No.: WO2021/245920
PCT Pub. Date: Dec. 9, 2021

(65) Prior Publication Data
US 2023/0109061 A1    Apr. 6, 2023

(51) Int. Cl.
*F16J 15/447*        (2006.01)
*F16H 49/00*         (2006.01)
(Continued)

(52) U.S. Cl.
CPC .......... *F16J 15/447* (2013.01); *F16H 49/001* (2013.01); *F16H 57/0427* (2013.01);
(Continued)

(58) Field of Classification Search
CPC ........ F16J 15/447; F16J 15/324; F16J 15/444; F16H 49/001; F16H 57/0427; F16H 57/04
See application file for complete search history.

(56) References Cited

FOREIGN PATENT DOCUMENTS

| CN | 110645355 A | * | 1/2020 | ............. F16J 15/002 |
| JP | 2006144971 A |   | 6/2006 | |

(Continued)

OTHER PUBLICATIONS

International Search Report (PCT/ISA/210) with translation and Written Opinion (PCT/ISA/237) mailed on Aug. 18, 2020, by the Japan Patent Office as the International Searching Authority for International Application No. PCT/JP2020/022359.

*Primary Examiner* — Gilbert Y Lee
(74) *Attorney, Agent, or Firm* — BUCHANAN INGERSOLL & ROONEY PC

(57) ABSTRACT

A strain wave gearing is provided with a lubricant sealing structure that prevents a lubricant from leaking to the outside through a gap between a hollow input shaft and an end plate. The lubricant sealing structure is provided with a labyrinth seal that seals the gap. The labyrinth seal is configured by a plurality of gap portions defined by an oil-repellent surface in which fine grooves are formed in a prescribed groove array pattern. The oil-repellent surface is also formed at an outer peripheral surface portion on an upstream side of the labyrinth seal. Leakage of a lubricant oil to outside of the device can be reliably prevented through the oil-repellent effect of the oil-repellent surface at the upstream side, the sealing effect of the labyrinth seal, and the oil-repellent effect from the oil-repellent surface of the labyrinth seal.

10 Claims, 8 Drawing Sheets

(51) Int. Cl.
 *F16H 57/04* (2010.01)
 *F16J 15/324* (2016.01)
 *F16J 15/44* (2006.01)
(52) U.S. Cl.
 CPC .......... *F16H 57/048* (2013.01); *F16J 15/324* (2013.01); *F16J 15/444* (2013.01)

(56) References Cited

FOREIGN PATENT DOCUMENTS

| | | | |
|---|---|---|---|
| JP | 2006226459 | A | 8/2006 |
| JP | 2006258234 | A | 9/2006 |
| JP | 2007333054 | A | 12/2007 |
| JP | 2012117671 | A | 6/2012 |
| JP | 5465109 | B2 | 1/2014 |
| JP | 2015193922 | A | 11/2015 |
| JP | 2017009085 | A | 1/2017 |
| JP | 2017214996 | A | 12/2017 |
| JP | 2019094997 | A | 6/2019 |
| WO | 2018189798 | A1 | 10/2018 |

* cited by examiner

LUBRICANT SEALING STRUCTURE, STRAIN WAVE GEARING, AND ACTUATOR

TECHNICAL FIELD

The present invention relates to a lubricant sealing structure used in a strain wave gearing, in an actuator that is provided with a strain wave gearing and a motor, and in other mechanical devices. More specifically, the present invention relates to a lubricant sealing structure that prevents lubricant from leaking out from the interior of a device to the exterior through a space between a first member and a second member that rotate relative to one another.

BACKGROUND ART

In strain wave gearings and other gearing devices, a rotation-side member such as an input shaft or an output shaft is supported by a device housing or other secured-side member via bearings. A gap is formed between the rotation-side member and the secured-side member.

Typically, the gap is sealed by an oil seal in order to prevent lubricant such as oil or grease with which the interior of the device is filled from leaking outside of the device or to other sites within the device through the gap.

Patent document 1 (JP 2006-258234 A) proposes a lubricant sealing structure in which the sealing properties of an oil seal are enhanced. In this lubricant sealing structure, a fluorine-based grease having oil repellency with respect to lubricant is applied to portions of a rotating member that are sealed by an oil seal, and the sealing properties are enhanced.

Lubricant sealing structures in which labyrinth seals are used in lieu of oil seals are also known. Patent document 2 (JP 2007-333054 A) proposes a roll bearing device provided with a labyrinth gap formed between a secured-side member and a rotation-side member, and an oil-repellent and water-repellent surface formed by coating the surfaces that form the labyrinth gap with an oil-repellent and water-repellent material. Patent document 3 (JP 2017-9085 A) proposes a contactless sealing device provided with a labyrinth flow path that is incorporated between an axle and a casing of a gearing device for a railway vehicle, the labyrinth flow path defined by an oil-repellent treated surface.

Moreover, surface texturing, in which fine grooves, etc., are machined into a designated surface, is known as a technique for modifying surfaces such as sliding surfaces. Patent document 4 (JP 2017-214996 A) proposes forming a periodic structure of recesses and protrusions in the form of a fine grating in a sliding surface, and preventing any increase in friction and any occurrence of burning caused by a deficiency of lubricant, through surface machining in which a femtosecond laser is used. Additionally, Patent document 5 (Japanese Patent No. 5465109) proposes interposing a lubricating fluid onto sliding surfaces between two members and forming very small grooves in the sliding surfaces through laser machining, thereby imparting a strong friction-reducing effect.

PRIOR-ART LITERATURE

Patent Literature

Patent document 1: JP 2006-258234 A
Patent document 2: JP 2007-333054 A
Patent document 3: JP 2017-9085 A
Patent document 4: JP 2017-214996 A
Patent document 5: JP 5465109 B

DISCLOSURE OF THE INVENTION

Problems to be Solved by the Invention

It is an object of the present invention to provide a lubricant sealing structure with which it is possible, by using fine groove machining (surface texturing), to reliably prevent lubricant from leaking out through a gap portion between first and second members that rotate relative to one another.

Means of Solving the Problems

According to the present invention, there is provided a lubricant sealing structure that prevents lubricant from leaking out, from an interior of a device provided with a first member and a second member that rotate relative to one another about a central axis, through a gap portion between the first and second members, wherein a labyrinth seal for sealing the gap is provided, the labyrinth seal is formed between a first surface portion on a first-member side and a second surface portion on a second-member side, the first and second surface portions facing each other;

oil-repellent surfaces provided with oil repellency with respect to the lubricant are formed on each of the first and second surface portions;

an upstream-side oil-repellent surface provided with oil repellency is formed on at least one of a first upstream-side surface portion and a second upstream-side surface portion, the first upstream-side surface portion being connected to the first surface portion and located on an upstream side in a direction in which the lubricant leaks, and the second upstream-side surface portion being connected to the second surface portion and located on an upstream side in the direction in which the lubricant leaks;

each of the oil-repellent surfaces and the upstream-side oil-repellent surface is provided with surface texturing in which fine grooves are formed in a prescribed groove array pattern;

the fine grooves are provided with a groove width and a groove depth ranging from several microns to several tens of nanometers; and the groove array pattern is such that the fine grooves are arrayed at spacings ranging from several microns to several tens of nanometers.

In the lubricant sealing structure according to the present invention, the oil-repellent surfaces in which a groove array pattern of fine grooves has been produced are formed in the first and second surface portions forming the labyrinth seal for sealing the gap between the first and second members. Additionally, the upstream-side oil-repellent surfaces are formed on the first and second upstream-side surface portions positioned further upstream than the labyrinth seal in the direction in which the lubricant leaks. The lubricant leaking through the gap deforms into spheroids after being repelled by the upstream-side oil-repellent surfaces. The dimensions of the gap in the labyrinth seal are made smaller than the size (diameter) of the spheroidal lubricant, whereby the flow of lubricant into the gap forming the labyrinth seal is suppressed. Additionally, because the labyrinth seal is formed by the oil-repellent surfaces, the flow of lubricant into the labyrinth seal is suppressed.

In the lubricant sealing structure according to the present invention, the oil-repelling effect produced by the upstream-side oil-repellent surface formed by implementing surface texturing through fine groove machining, the sealing effect produced by the labyrinth seal, and the oil-repelling effect produced by the oil-repellent surface that regulates the labyrinth seal operate synergistically, and exceptional sealing properties are achieved and maintained. The lubricant is thereby reliably prevented from leaking from the lubricant enclosure portions in the interior of the device to, inter alia, the exterior of the device.

Any of the following array patterns (1) to (5) can be employed as the groove array pattern for imparting oil repellency to the member surfaces. Additionally, a composite array pattern in which a plurality of array patterns selected from among these array patterns are combined can also be employed.

(1) An array pattern in which the fine grooves extend, at the spacings, in a straight line, curve, or undulating form in a direction following the central axis of the device.

(2) An array pattern in which the fine grooves extend, at the spacings, in a straight line, curve, or undulating form in a circumferential direction centered on the central axis.

(3) An array pattern in which the fine grooves extend, at the spacings, in a straight line, curve, or undulating form in a direction inclined relative to the direction following the central axis.

(4) An array pattern in which the fine grooves extend in a spiral at the spacings.

(5) An array pattern in which the fine grooves are formed in a mesh at the spacings.

In the lubricant sealing structure according to the present invention, an oil reservoir having large gap dimensions can be formed in part of the gap portion constituting the labyrinth seal. Lubricant that has penetrated the gap portion of the labyrinth seal is trapped in the oil reservoir, whereby leakage of the lubricant can be reliably prevented.

In cases where the oil reservoir is formed, an oil absorber composed of a non-woven fabric or another porous material can be mounted in the oil reservoir. The lubricant can be reliably prevented from flowing downstream from the oil reservoir.

Additionally, the inner peripheral surface portion of the oil reservoir can be configured as an oleophilic surface provided with oleophilic properties with respect to the lubricant. This makes it possible to efficaciously prevent the lubricant that has collected in the oil reservoir from flowing downstream.

A gap portion in which the gap dimensions gradually decrease toward the direction in which the lubricant leaks can be formed in part of the gap portion constituting the labyrinth seal. For example, a gap portion having a wedge shape in cross-section can be formed. Suitably setting the gap dimensions of this gap portion makes it easier for the lubricant to be trapped in the gap portion and makes it possible to efficaciously prevent the lubricant from flowing downstream.

MODE FOR CARRYING OUT THE INVENTION

Embodiments of a lubricant sealing structure to which the present invention is applied are described below with reference to the accompanying drawings. The embodiments described below illustrate cases where the lubricant sealing structure according to the present invention is applied to a strain wave gearing and to an actuator provided with a strain wave gearing and a motor. The present invention also can similarly be applied to gear-type reducers and other rotation-transmitting devices other than strain wave gearings.

Embodiment 1

Figure 1A:
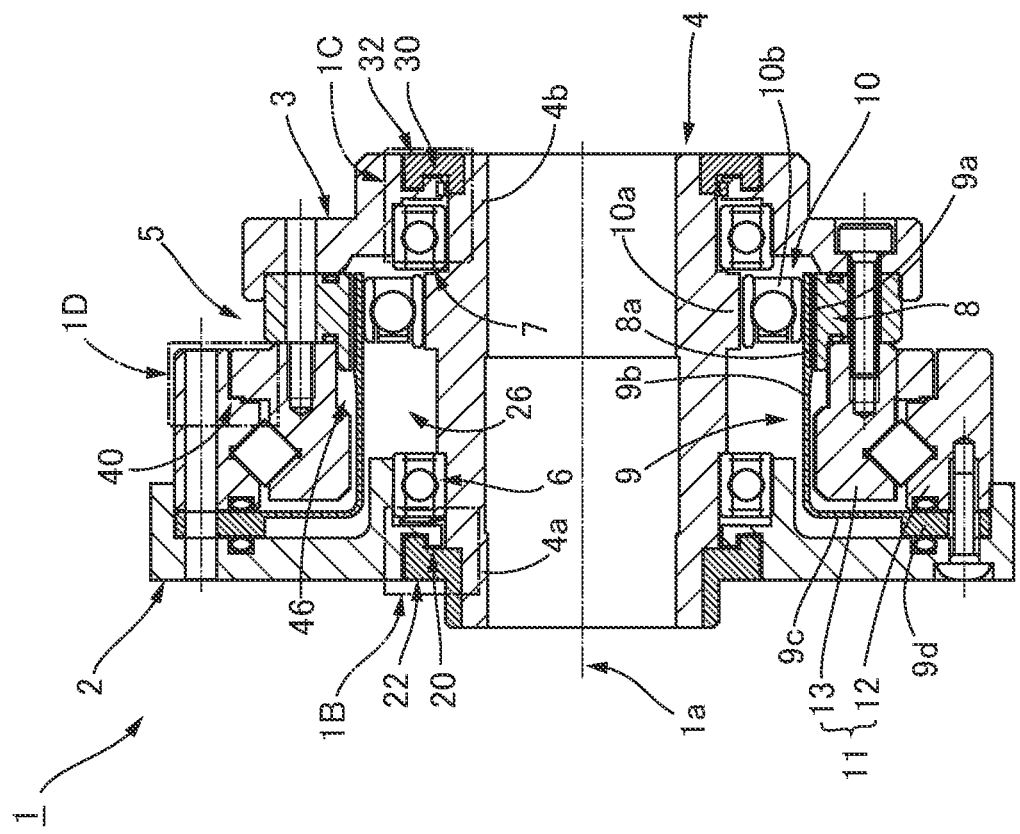
FIG. 1A is a schematic longitudinal cross-sectional view of a strain wave gearing provided with the lubricant sealing structure according to the present invention.

FIG. 1A is a schematic longitudinal cross-sectional view of a strain wave gearing according to embodiment 1 of the present invention. The strain wave gearing 1 is provided with: disc-form end plates 2 and 3 that face each other across a prescribed spacing in the direction of a central axis 1$a$; a hollow input shaft 4 that extends coaxially through central portions of the end plates 2, 3; and a wave gear mechanism 5 that is incorporated between the end plates 2, 3 in a state of coaxially surrounding the hollow input shaft 4. The hollow input shaft 4 is supported by the end plates 2, 3, with ball bearings 6, 7 interposed therebetween, in a state that allows rotation. The wave gear mechanism 5 is provided with an annular rigid internally toothed gear 8, a top-hat-shaped elastic externally toothed gear 9, an ellipsoidally contoured wave generator 10, and cross-roller bearing 11 that supports the internally toothed gear 8 and the externally toothed gear 9 in a state that allows relative rotation.

The externally toothed gear 9 is provided with a flexible cylindrical barrel part 9$b$ on which external teeth 9$a$ are formed, a disc-form diaphragm 9$c$ that spreads radially outward from the end of the cylindrical barrel part 9$b$, and an annular rigid boss 9$d$ formed integrally with the outer peripheral edge portion of the diaphragm 9$c$. The opening-end-side portion of the cylindrical barrel part 9$b$ where the external teeth 9$a$ are formed is disposed coaxially inside the internally toothed gear 8. The wave generator 10 is coaxially fitted into the inner side of the opening-end-side portion of the cylindrical barrel part 9$b$. The wave generator 10 is provided with a plug part 10$a$ formed integrally with the outer peripheral surface portion of the hollow input shaft 4, and a wave bearing 10$b$ mounted on the ellipsoidal outer peripheral surface of the plug part 10$a$. The cylindrical barrel part 9$b$ of the externally toothed gear 9 is flexed into an ellipsoidal shape by the wave generator 10, and portions of the external teeth 9a positioned at both long-axis ends of the ellipsoidal shape mesh with internal teeth 8a of the internally toothed gear 8.

The boss 9d of the externally toothed gear 9 is sandwiched between the end plate 2 and an outer race 12 of the cross-roller bearing 11 from both sides along the central-axis 1a direction, and these three members are securely fastened in this state. The internally toothed gear 8 is sandwiched between the end plate 3 and an inner race 13 of the cross-roller bearing 11 from both sides along the central-axis 1a direction, and these three members are securely fastened in this state.

The hollow input shaft 4 is a rotation-inputting member linked to a motor, etc. When the hollow input shaft 4 rotates, the wave generator 10 rotates integrally therewith, and the positions where the externally toothed gear 9 meshes with the internally toothed gear 8 move in the circumferential direction. The two gears 8, 9 undergo relative rotation that corresponds to the difference between the numbers of teeth of the two gears 8, 9. For example, the end plate 2 to which the externally toothed gear 9 is fastened is configured as a secured-side member, the end plate 3 to which the internally toothed gear 8 is fastened is configured as a rotation-outputting member, and relative rotation (reduced rotation) is outputted from the end plate 3.

Examples of lubricated portions in the interior of the strain wave gearing 1 include the portions where the externally toothed gear 9 and the internally toothed gear 8 mesh, the portions where the externally toothed gear 9 and the wave generator 10 contact each other, sliding sections of the cross-roller bearing 11 and the wave bearing 10b of the wave generator 10, and sliding sections of the ball bearings 6, 7. Lubricant sealing structures for preventing lubricant enclosed in or applied to these portions from leaking from the interior of the strain wave gearing 1 to the exterior are incorporated into the strain wave gearing 1. The strain wave gearing 1 according to the present example is provided with a site 1B where a lubricant sealing structure provided with a labyrinth seal 20 is incorporated, a site 1C where a lubricant sealing structure provided with a labyrinth seal 30 is incorporated, and a site 1D where a lubricant sealing structure provided with a labyrinth seal 40 is incorporated.

The lubricant sealing structure provided with the labyrinth seal 20 at the site 1B creates a seal between the end plate 2 and one shaft end section 4a of the hollow input shaft 4, and prevents lubricant from leaking out from a portion of the ball bearing 6 and from a lubricant enclosure portion 26 located between the hollow input shaft 4 and the externally toothed gear 9 between the end plates 2, 3. The lubricant sealing structure provided with the labyrinth seal 30 at the site 1C creates a seal between the end plate 3 and the other shaft end section 4b of the hollow input shaft 4, and prevents lubricant from leaking out from a portion of the ball bearing 7 and from the lubricant enclosure portion 26. The lubricant sealing structure provided with the labyrinth seal 40 at the site 1D creates a seal between the outer race 12 and the inner race 13 of the cross-roller bearing 11, and prevents lubricant from leaking out from a portion of the cross-roller bearing 11 and from a lubricant enclosure portion 46 formed between the externally toothed gear 9, the cross-roller bearing 11, and the internally toothed gear.

(Lubricant Sealing Structure at Site 1B)

Figure 1E:
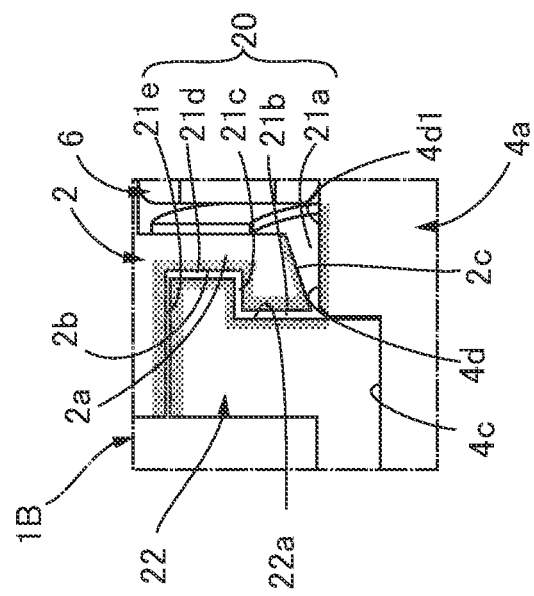
FIG. 1E is an illustrative diagram of a modification of the lubricant sealing structure shown in FIG. 1B.
Figure 1B:
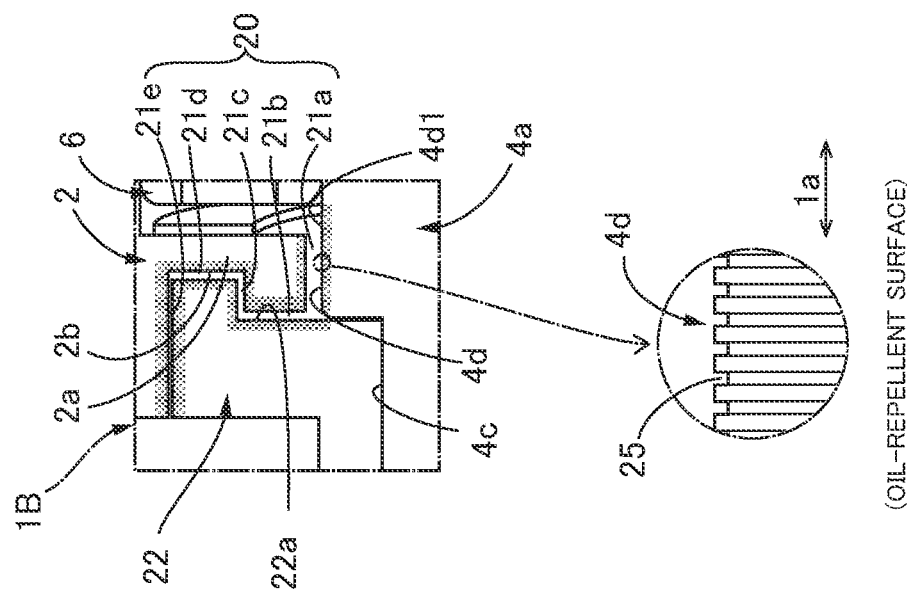
FIG. 1B is an illustrative diagram of a site 1B where the lubricant sealing structure is incorporated into the strain wave gearing shown in FIG. 1A.

FIG. 1B is an illustrative diagram of the lubricant sealing structure provided with the labyrinth seal 20 that creates a seal between the end plate 2 and the shaft end section 4a of the hollow input shaft 4. The one shaft end section 4a of the hollow input shaft 4 is rotatably supported in the end plate 2 via the ball bearing 6. The shaft end section 4a of the hollow input shaft 4 protrudes toward the exterior of the device through a central portion of the end plate 2. A gap that allows communication from the ball-bearing 6 side (lubricant-enclosure-portion 26 side) to the exterior of the device is formed between the end plate 2 and the shaft end section 4a of the hollow input shaft 4. The gap is sealed by the labyrinth seal 20.

An annular member 22 is mounted in the gap between the end plate 2 and the shaft end section 4a of the hollow input shaft 4. The annular member 22 is securely press-fitted onto an outer peripheral surface portion 4c of the shaft end section 4a of the hollow input shaft 4. An annular protrusion 2a that protrudes inward is formed on the inner peripheral surface of the end plate 2 so as to face the annular member 22 in the axial direction. The labyrinth seal 20 is formed between a surface portion 2b on the annular-protrusion 2a side of the end plate 2 and a surface portion 22a on the annular-member 22 side of the hollow input shaft 4, the surface portion 22a facing the surface portion 2b.

The labyrinth seal 20 according to the present example is an axial labyrinth seal and is such that gap portions 21a, 21c, 21e extending in the axial direction and gap portions 21b, 21d extending in the radial direction are alternatingly formed from the upstream side toward the downstream side in the direction in which lubricant leaks. The gap portions 21a to 21e are such that the downstream-side gap portions are narrower than the upstream-side gap portions. Furthermore, the radial-direction gap dimensions of the furthest-upstream gap portion 21a in the labyrinth seal 20 are set to values that are less than the diameter of lubricant grains, which are formed into spheroids after being repelled by an oil-repellent surface that shall be described below.

An oil-repellent surface provided with oil repellency with respect to the lubricant is formed on the surface portion 2b on the end-plate 2 side where the gap portions 21a to 21e are formed. In FIG. 1B, a dotted pattern is used to indicate the region on the surface portion 2b where the oil-repellent surface is formed. Oil-repellent surfaces are also formed on the surface portion 22a of the annular member 22 that faces the surface portion 2b on the end-plate 2 side, and on an outer peripheral surface portion 4d of the hollow input shaft 4. A dotted pattern is also used to indicate the regions on the surface portion 22a and the outer peripheral surface portion 4d where the oil-repellent surfaces are formed. On the shaft end section 4a of the hollow input shaft 4, oil-repellent surfaces (upstream-side oil-repellent surfaces) are formed not only on the outer peripheral surface portion 4d where the gap portion 21a is formed but also on an outer peripheral surface portion 4d1 (upstream-side surface portion) extending from the outer peripheral surface portion 4d to a site at which an outer race of the ball bearing 6 is mounted.

The oil-repellent surfaces according to the present example are provided with surface texturing in which fine grooves are formed in a prescribed groove array pattern so as to achieve oil repellency with respect to the enclosed lubricant. The fine grooves are provided with a groove width and a groove depth ranging from several microns to several tens of nanometers, and the groove array pattern is such that the fine grooves are arrayed at spacings ranging from several microns to several tens of nanometers. For example, fine grooves 25 that form the oil-repellent surface on the outer peripheral surface portion 4d of the hollow input shaft 4 extend in the circumferential direction and are arrayed at fixed intervals in the direction of the central axis 1a, as is schematically shown in FIG. 1B.

A variety of groove array patterns can be employed as the groove array pattern of the fine grooves 25 that form the oil-repellent surface. For example, it is possible to use a groove array pattern in which fine grooves 25 extending in a straight line, curve, or undulating form in a direction following the central axis 1a are formed at fixed intervals in the circumferential direction. The fine grooves 25 may form a groove array pattern in which fine grooves 25 extending in a straight line, curve, or undulating form in a circumferential direction centered on the central axis 1a are formed at fixed intervals in the central-axis 1a direction. It is also possible to employ a groove array pattern configured from fine grooves 25 extending in a straight line, curve, or undulating form in a direction that is inclined relative to the direction following the central axis 1a. It is additionally possible to employ a groove array pattern configured from fine grooves 25 extending in a spiral at a fixed pitch in the central-axis 1a direction. Furthermore, it is also possible to employ a reticulate groove array pattern in which fine grooves 25 extending in the central-axis 1a direction and fine grooves 25 extending in the circumferential direction intersect. It is moreover possible to employ a groove array pattern having a configuration in which the aforementioned groove array patterns overlap.

As described above, a seal is created between the hollow input shaft 4 and the end plate 2 by the labyrinth seal 20, and the lubricant is prevented from leaking to the exterior of the device. Because the gap portions 21a to 21e constituting the labyrinth seal 20 are regulated by the oil-repellent surfaces, lubricant that has penetrated the labyrinth seal 20 is efficaciously prevented from flowing out toward the exterior of the device. Furthermore, the outer peripheral surface portion 4d1 of the hollow input shaft 4 is also configured as an oil-repellent surface (upstream-side oil-repellent surface). Lubricant flowing into the labyrinth seal 20 from the ball-bearing 6 side is repelled by this oil-repellent surface, and deforms into spheroidal grains just before penetrating the gap portion 21a of the labyrinth seal 20. Because the radial-direction gap dimensions of the gap portion 21a are smaller than the diameter of the spheroidal lubricant grains thus formed, penetration of the lubricant into the gap portion 21a is suppressed. Additionally, because the downstream-side gap portions among the gap portions 21a to 21e constituting the labyrinth seal 20 are narrower than the upstream-side gap portions, lubricant that has penetrated the upstream-side gap portions is efficaciously prevented from flowing into the downstream-side gap portions.

In the present example, the gap dimensions at individual radial-direction positions are the same in each of the gap portions 21a, 21c, 21e extending in the axial direction. Additionally, the gap dimensions in the axial direction are the same in each of the gap portions 21b, 21d extending in the radial direction. It is also possible to use gap portions in which the gap dimensions gradually decrease from the interior of the device toward the exterior (i.e., gap portions having a wedge-shaped cross-section).

For example, as shown in FIG. 1E, the gap portion 21a can be configured such that the radial-direction gap dimensions thereof gradually decrease from the lubricant-enclosure-portion 26 side toward the exterior of the device. For example, an inner peripheral surface portion 2c on the surface portion 2b on the end-plate 2 side where the gap portion 21a is formed is to be configured as a tapered inner peripheral surface. In this case, at least the minimum gap dimensions of the gap portion 21a are to be set to values that are less than the diameter of the lubricant grains formed into spheroids on the oil-repellent surface. Gap portions in which the gap dimensions gradually decrease toward the downstream side can also be applied in a similar manner to the lubricant sealing structures described below and to lubricant sealing structures in embodiment 2 that shall be described later.

(Lubricant Sealing Structure at Site 1C)

Figure 1C:
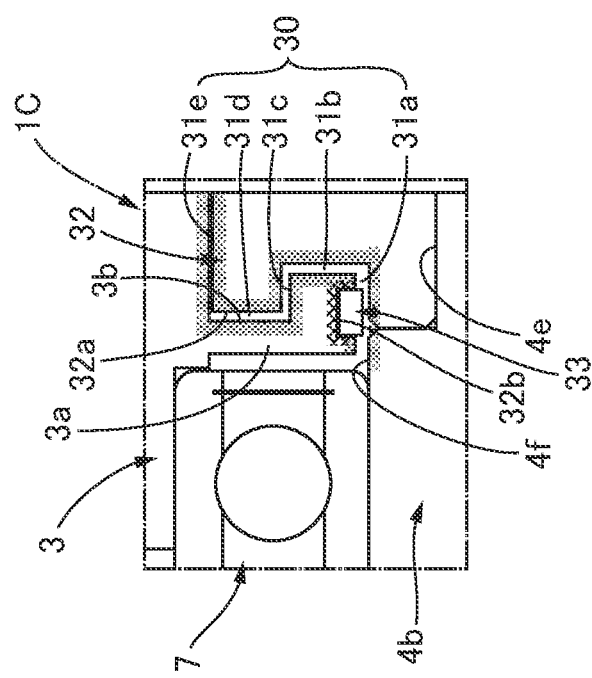
FIG. 1C is an illustrative diagram of a site 1C where the lubricant sealing structure is incorporated into the strain wave gearing shown in FIG. 1A.

FIG. 1C is an illustrative diagram of the lubricant sealing structure provided with the labyrinth seal 30 that creates a seal between the end plate 3 and the other shaft end section 4b of the hollow input shaft 4. The shaft end section 4b of the hollow input shaft 4 is rotatably supported in the end plate 3 via the ball bearing 7. The shaft end section 4b of the hollow input shaft 4 protrudes toward the exterior of the device through a central portion of the end plate 3. A gap that allows communication from the ball-bearing 7 side (lubricant-enclosure-portion 26 side) to the exterior of the device is formed between the end plate 3 and the shaft end section 4b of the hollow input shaft 4. The gap is sealed by the labyrinth seal 30.

An annular member 32 is mounted in the gap between the end plate 3 and the shaft end section 4b of the hollow input shaft 4. The annular member 32 is securely press-fitted onto an outer peripheral surface portion 4e of the shaft end section 4b of the hollow input shaft 4. An annular protrusion 3a that protrudes inward is formed on the inner peripheral surface of the end plate 3 so as to face the annular member 32 in the axial direction. The labyrinth seal 30 is formed between a surface portion 3b on the annular-protrusion 3a side of the end plate 3 and a surface portion 32a on the annular-member 32 side, the surface portion 32a facing the surface portion 3b.

In the labyrinth seal 30 according to the present example, gap portions 31a, 31c, 31e extending in the axial direction and gap portions 31b, 31d extending in the radial direction are alternatingly formed from the upstream side toward the downstream side in the direction in which lubricant leaks. The gap portions 31a to 31e are such that the downstream-side gap portions are narrower than the upstream-side gap portions. Furthermore, the radial-direction gap dimensions of the furthest-upstream gap portion 31a in the labyrinth seal 30 are set to values that are less than the diameter of lubricant grains, which are formed into spheroids after being repelled by an oil-repellent surface that shall be described below.

The surface portion 3b on the end-plate 3 side where the gap portions 31a to 31e are formed is an oil-repellent surface provided with oil repellency with respect to the lubricant. In FIG. 1C, a dotted pattern is used to indicate the range over which the oil-repellent surface is formed. The surface portion 32a of the annular member 32 that faces the surface portion 3b is also configured as an oil-repellent surface. A dotted pattern is also used to indicate the range over which the oil-repellent surface on the surface portion 32a is formed. On the shaft end section 4b of the hollow input shaft 4, an oil-repellent surface (upstream-side surface portion) is also formed on part of an outer peripheral surface portion 4f at which the ball bearing 7 is mounted. The oil-repellent surfaces have the same configurations as the oil-repellent surfaces of the labyrinth seal 20 described above, and therefore are not described here.

An oil reservoir is formed in the gap portion 31a of the labyrinth seal 30. Specifically, a groove 32b of rectangular cross-section that extends in the circumferential direction is formed in the inner peripheral surface of the annular protrusion 3a of the end plate 3. The oil reservoir, in which the radial-direction gap dimensions are greater than those at other portions in the gap portion 31a, is formed by the groove 32b. The groove 32b is filled with a porous material, such as an oil absorber 33 composed of a non-woven fabric. Furthermore, a bottom surface portion and both inner peripheral side surface portions of the groove 32b are subjected to surface treatment and configured as oleophilic surfaces provided with oleophilic properties with respect to the lubricant. In FIG. 1C, cross-hatching is used to indicate the range over which the oleophilic surfaces are formed.

The lubricant flows out from the ball-bearing 7 side in the interior of the device to the gap between the hollow input shaft 4 and the end plate 3. The lubricant is prevented from leaking to the exterior of the device by the labyrinth seal 30. Additionally, because the downstream-side gap portions among the gap portions 31a to 31e constituting the labyrinth seal 30 are narrower than the upstream-side gap portions, lubricant that has penetrated the upstream-side gap portions is efficaciously prevented from flowing into the downstream-side gap portions. Furthermore, because the gap portions 31a to 31e constituting the labyrinth seal 30 are regulated by the oil-repellent surfaces, lubricant that has penetrated the labyrinth seal 30 is efficaciously prevented from flowing out toward the exterior of the device. Moreover, lubricant flowing from the ball-bearing 7 side toward the labyrinth seal 30 is repelled by the oil-repellent surface formed on the outer peripheral surface portion 4f of the shaft end section 4b of the hollow input shaft 4, and deforms into spheroidal grains just before penetrating the gap portion 31a of the labyrinth seal 30. Because the radial-direction gap dimensions of the gap portion 31a are smaller than the diameter of the spheroidal lubricant grains thus formed, the flow of the lubricant into the gap portion 31a is suppressed.

The oil reservoir filled with the oil absorber 33 is formed in the gap portion 31a of the labyrinth seal 30. Lubricant that has penetrated the labyrinth seal 30 is trapped in the oil reservoir and prevented from flowing out toward the downstream side (toward the exterior of the device). Because the inner peripheral surface portions of the groove forming the oil reservoir are configured as oleophilic surfaces, the lubricant trapped in the oil reservoir is efficaciously prevented from flowing out toward the downstream side by this configuration as well. Thus, the sealing effect produced by the labyrinth seal 30, the effect produced by the oil-repellent surface, and the effect produced by the oil reservoir provided with the oil absorber and the oleophilic surfaces make it possible to reliably prevent the lubricant from leaking to the exterior of the device.

(Lubricant Sealing Structure at Site 1D)

Figure 1D:
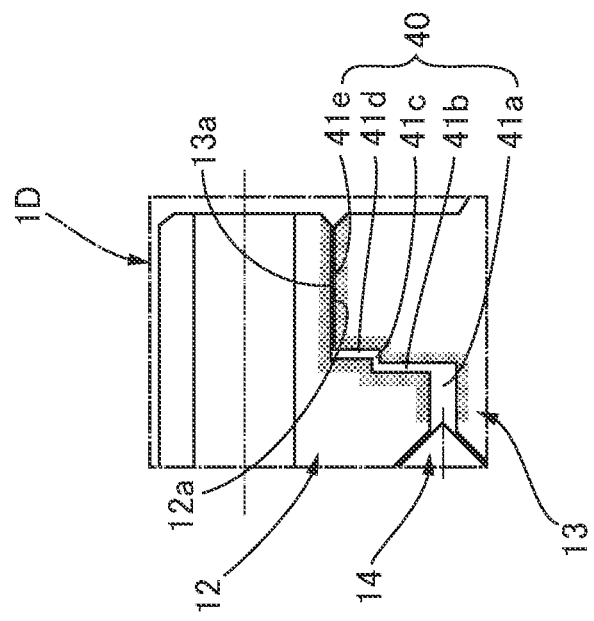
FIG. 1D is an illustrative diagram of a site 1D where the lubricant sealing structure is incorporated into the strain wave gearing shown in FIG. 1A.

The lubricant sealing structure provided with the labyrinth seal 40 that seals a gap between the outer race 12 and the inner race 13 of the cross-roller bearing 11 is described next. FIG. 1D is an illustrative diagram of the lubricant sealing structure provided with the labyrinth seal 40 that creates a seal between the outer race 12 and the inner race 13. A gap that allows communication from a raceway groove 14 to the exterior of the device is formed between outer race 12 and the inner race 13. The gap is sealed by the labyrinth seal 40. The labyrinth seal 40 is formed between an inner-peripheral-side surface portion 12a of the outer race 12 and an outer-peripheral-side surface portion 13a of the inner race 13, the outer-peripheral-side surface portion 13a facing the inner-peripheral-side surface portion 12a.

In the labyrinth seal 40, gap portions 41a, 41c, 41e extending in the axial direction and gap portions 41b, 41d extending in the radial direction are alternatingly formed along the direction from the lubricant-enclosure-portion side toward the exterior of the device. The gap portions 41a to 41e are such that the downstream-side gap portions are narrower than the upstream-side gap portions.

The inner-peripheral-side surface portion 12a of the outer race 12 where the gap portions 41a to 41e are formed is an oil-repellent surface provided with oil repellency with respect to the lubricant. In FIG. 1D, a dotted pattern is used to indicate the range over which the oil-repellent surface is formed. The outer-peripheral-side surface portion 13a of the inner race 13 that faces the inner-peripheral-side surface portion 12a is also configured as an oil-repellent surface. In FIG. 1D, a dotted pattern is also used to indicate the range over which the oil-repellent surface on the outer-peripheral-side surface portion 13a is formed. The oil-repellent surfaces are configured in the same manner as the oil-repellent surfaces of the labyrinth seal 20 described above, and therefore are not described here.

The lubricant flows out from the raceway-groove 14 side of the cross-roller bearing 11 in the interior of the device to the gap between the outer race 12 and the inner race 13. The lubricant is prevented from leaking to the exterior of the device by the labyrinth seal 40. Additionally, because the downstream-side gap portions among the gap portions 41a to 41e constituting the labyrinth seal 40 are narrower than the upstream-side gap portions, lubricant that has penetrated the upstream-side gap portions is efficaciously prevented from flowing into the downstream-side gap portions. Furthermore, because the gap portions 41a to 41e constituting the labyrinth seal 40 are regulated by the oil-repellent surfaces, lubricant that has penetrated the labyrinth seal 40 is efficaciously prevented from flowing out toward the exterior of the device. Thus, the sealing effect produced by the labyrinth seal 40 and the oil-repelling effect produced by the oil-repellent surface make it possible to reliably prevent the lubricant from leaking to the exterior of the device via the gap.

Embodiment 2

Figure 2A:
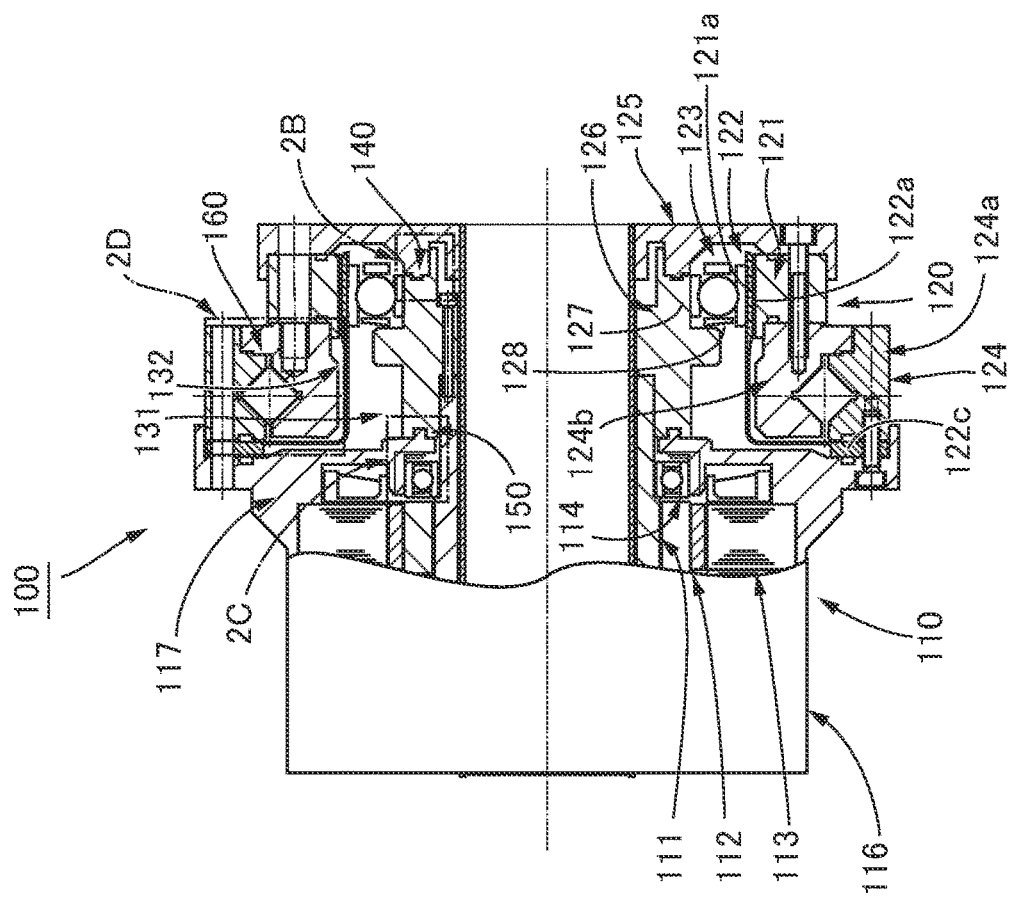
FIG. 2A is an outline longitudinal cross-sectional view of an actuator provided with the lubricant sealing structure according to the present invention.

FIG. 2A is a schematic longitudinal cross-sectional view of an actuator provided with the lubricant sealing structure according to the present invention. The actuator 100 is a hollow actuator provided with a hollow section extending through the center thereof, and is provided with a motor 110 and a strain wave gearing 120. The motor 110 is provided with a hollow motor shaft 111, a rotor 112 attached to the outer peripheral surface of the hollow motor shaft 111, and a stator 113 that coaxially surrounds the rotor 112. The hollow motor shaft 111 is rotatably supported, at both ends thereof, by a motor housing 116 with ball bearings interposed therebetween (only one ball bearing 114 is shown in the drawings).

The motor housing 116 is provided with a large-diameter attachment flange 117 at the front end thereof. The strain wave gearing 120 is coaxially attached to the front surface of the attachment flange 117. The strain wave gearing 120 is provided with a rigid internally toothed gear 121, a top-hat-shaped flexible externally toothed gear 122, a wave generator 123, a cross-roller bearing 124 that supports the internally toothed gear 121 and the externally toothed gear 122 in a state that allows relative rotation, and a disc-form output shaft 125.

The wave generator 123 is provided with a hollow input shaft 126 that is coaxially linked to the hollow motor shaft 111, and an ellipsoidally contoured plug 127 being formed integrally with the outer peripheral surface of the hollow input shaft 126. A wave bearing 128 is mounted on the ellipsoidal outer peripheral surface of the plug 127. A cylindrical barrel part of the externally toothed gear 122, on which external teeth 122a are formed, is flexed into an ellipsoidal shape by the wave generator 123, and the external teeth partially meshes with internal teeth 121a of the internally toothed gear 121.

An annular boss 122c of the externally toothed gear 122 is sandwiched between the attachment flange 117 and an outer race 124a of the cross-roller bearing 124, and these three members are securely fastened in this state. The internally toothed gear 121 is sandwiched between an inner race 124b of the cross-roller bearing 124 and the output shaft 125, and these three members are securely fastened in this state. Output rotation of the motor 110 is inputted from the hollow motor shaft 111 to the wave generator 123. When the wave generator 123 rotates, the internally toothed gear 121 rotates at a reduced speed, and reduced-speed rotation is outputted from the output shaft 125 linked to the internally toothed gear 121 to a load side (not shown).

Examples of lubricated portions in the interior of the strain wave gearing 120 include the portions where the externally toothed gear 122 and the internally toothed gear 121 mesh, the portions where the externally toothed gear 122 and the wave generator 123 contact each other, and the cross-roller bearing 124 and the wave bearing 128 of the wave generator 123. A site 2B of a lubricant sealing structure provided with a labyrinth seal 140, a site 2C of a lubricant sealing structure provided with a labyrinth seal 150, and a site 2D of a lubricant sealing structure provided with a labyrinth seal 160 are incorporated into the strain wave gearing 120 in order to prevent lubricant from leaking from lubricant enclosure portions 131, 132 in the interior of the strain wave gearing 120 to the exterior of the device or toward the motor 110.

(Lubricant Sealing Structure at Site 2B)

Figure 2B:
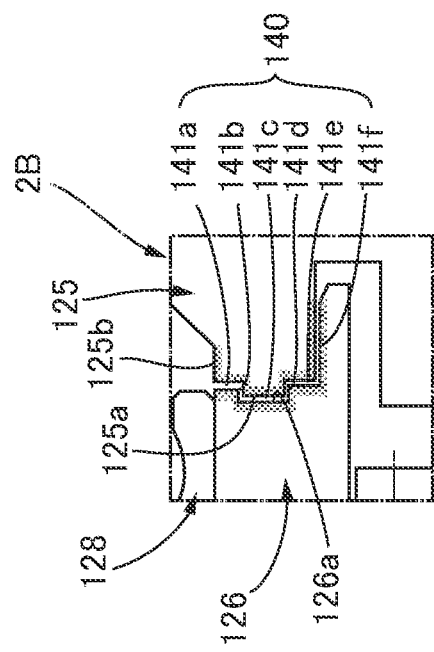
FIG. 2B is an illustrative diagram of a site 2B where the lubricant sealing structure is incorporated into the actuator shown in FIG. 2A.

FIG. 2B is an illustrative diagram of the site of the lubricant sealing structure provided with the labyrinth seal 140 that creates a seal between the hollow input shaft 126 and the output shaft 125. The space between the hollow input shaft 126, which rotates at high speed, and the output shaft 125, which rotates at a reduced speed, is sealed by the lubricant sealing structure provided with the labyrinth seal 140. An internal space in the externally toothed gear 122 in which the wave bearing 128 is disposed is a lubricant enclosure portion 131 (refer to FIG. 2A) in which is enclosed lubricant supplied, inter alia, to the wave bearing 128 or to sliding portions between the wave bearing 128 and the externally toothed gear 122. A gap that passes through from the wave bearing 128 positioned toward the interior of the device to the exterior of the device is formed between the hollow input shaft 126 and the output shaft 125. The gap is sealed by the labyrinth seal 140. The labyrinth seal 140 is formed between an inner-peripheral-side surface portion 125a of the output shaft 125 and a shaft-end-side surface portion 126a of the hollow input shaft 126, the shaft-end-side surface portion 126a facing the inner-peripheral-side surface portion 125a.

The labyrinth seal 140 is an axial labyrinth seal and is such that gap portions 141a, 141c, 141e extending in the radial direction and gap portions 141b, 141d, 141f extending in the axial direction are alternatingly formed along the direction from the lubricant sealing structure toward the exterior of the device. The gap portions 141a to 141e are such that the downstream-side gap portions are narrower than the upstream-side gap portions. Furthermore, the axial-direction gap dimensions of the furthest-upstream gap portion 141a in the labyrinth seal 140 are set to values that are less than the diameter of lubricant grains, which are formed into spheroids after being repelled by an oil-repellent surface that shall be described below.

An oil-repellent surface provided with oil repellency with respect to the lubricant is formed on the inner-peripheral-side surface portion 125a of the output shaft 125 where the gap portions 141a to 141f are formed. Additionally, an oil-repellent surface (upstream-side oil-repellent surface) is also formed on an outer peripheral surface portion 125b (upstream-side surface portion) that is connected to the inner side of the device (upstream side in the direction in which lubricant leaks) with respect to the gap portion 141a. Furthermore, an oil-repellent surface is additionally formed on the surface portion 126a of the hollow input shaft 126. In FIG. 2B, a dotted pattern is applied along surface portions where the oil-repellent surfaces are formed in order to indicate these surface portions. The oil-repellent surfaces are surface portions in which fine grooves are formed in a prescribed groove array pattern in the same manner as with the oil-repellent surfaces on the labyrinth-seal 20 side in embodiment 1 described above, and therefore are not described here.

The lubricant flows out from the interior of the device to the gap between the hollow input shaft 126 and the output shaft 125. Because the lubricant is sealed by the labyrinth seal 140, the lubricant is prevented from leaking to the exterior of the device. Additionally, because the downstream-side gap portions among the gap portions 141a to 141f constituting the labyrinth seal 140 are narrower than the upstream-side gap portions, lubricant that has penetrated the upstream-side gap portions is efficaciously prevented from flowing into the downstream-side gap portions. Furthermore, because the gap portions 141a to 141f are regulated by the oil-repellent surfaces, lubricant that has penetrated the labyrinth seal 140 is efficaciously prevented from flowing out toward the exterior of the device. Moreover, lubricant flowing into the labyrinth seal 140 is repelled by the oil-repellent surface formed on the outer peripheral surface portion 125b of the output shaft 125, and deforms into spheroidal grains just before penetrating the gap portion 141a of the labyrinth seal 140. Because the axial-direction gap dimensions of the gap portion 141a are smaller than the diameter of the spheroidal lubricant grains thus formed, the flow of the lubricant into the gap portion 141a is suppressed.

Thus, the oil-repelling effect produced by the upstream-side oil-repellent surface, the sealing effect produced by the labyrinth seal 140, and the oil-repelling effect produced by the oil-repellent surface that regulates the labyrinth seal 140 make it possible to reliably prevent the lubricant from leaking to the exterior of the device.

(Lubricant Sealing Structure at Site 2C)

Figure 2C:
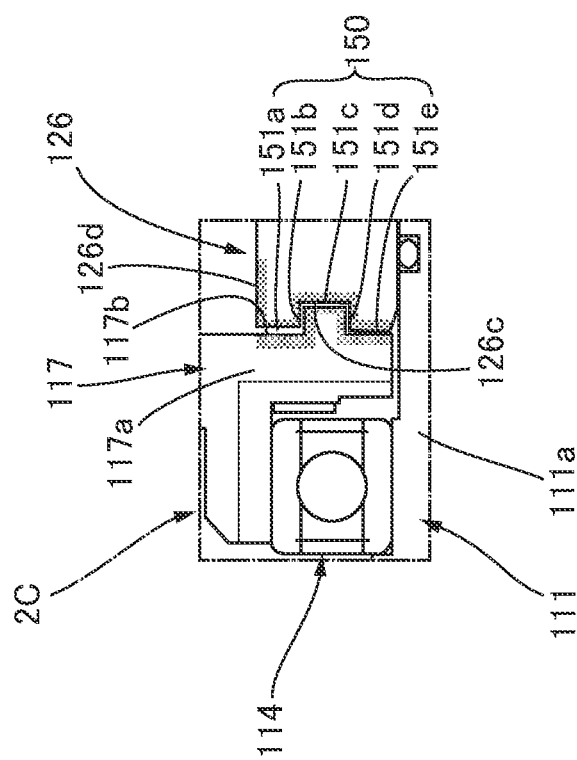
FIG. 2C is an illustrative diagram of a site 2C where the lubricant sealing structure is incorporated into the actuator shown in FIG. 2A.

FIG. 2C is an illustrative diagram of the site of the lubricant sealing structure provided with the labyrinth seal 150 that creates a seal between the strain wave gearing 120 and the motor 110. The lubricant is prevented from leaking from the strain-wave-gearing 120 side toward the motor 110 side by this lubricant sealing structure. The ball bearing 114 is mounted between an inner peripheral edge section 117a of the attachment flange 117 and a shaft end section 111a of the hollow motor shaft 111, the shaft end section 111a facing the inner peripheral edge section 117a. The distal end of the shaft end section 111a of the hollow motor shaft 111 protrudes toward the strain-wave-gearing 120 side through the attachment flange 117. The hollow input shaft 126 of the strain wave gearing 120 is securely linked in a coaxial manner to the shaft end section 111a of the hollow motor shaft 111.

A gap is formed between the inner peripheral edge section 117a of the attachment flange 117 and the hollow input shaft 126 that faces the inner peripheral edge section 117a. The gap is sealed by the labyrinth seal 150. The labyrinth seal 150 is formed between a surface portion 117b of the inner peripheral edge section 117a of the attachment flange and a surface portion 126c of the hollow input shaft 126, the surface portion 126c facing the surface portion 117b from the axial direction.

In the labyrinth seal 150, gap portions 151a, 151c, 151e extending in the radial direction and gap portions 151b, 151d extending in the axial direction are alternatingly formed along the direction from the strain-wave-gearing 120 side toward the motor 110 side. The gap portions 151a to 151e are such that the downstream-side gap portions are narrower than the upstream-side gap portions. Furthermore, the axial-direction gap dimensions of the furthest-upstream gap portion 151a in the labyrinth seal 150 are set to values that are less than the diameter of lubricant grains, which are formed into spheroids after being repelled by an oil-repellent surface that shall be described below.

An oil-repellent surface provided with oil repellency with respect to the lubricant is formed on the surface portion 117b of the inner peripheral edge section 117a of the attachment flange where the gap portions 151a to 151e are formed. Additionally, an oil-repellent surface is also formed on the surface portion 126c on the shaft end of the hollow input shaft 126 that faces the surface portion 117b. Furthermore, an oil-repellent surface (upstream-side oil-repellent surface) is additionally formed on an outer peripheral surface portion 126d (upstream-side surface portion) on the inner side of the device with respect to the gap portion 151a. In FIG. 2C, a dotted pattern is applied along surface portions where the oil-repellent surfaces are formed in order to indicate these surface portions. The oil-repellent surfaces are surface portions in which fine grooves are formed in a prescribed groove array pattern in the same manner as with the oil-repellent surfaces on the labyrinth-seal 20 side in embodiment 1 described above, and therefore are not described here.

The lubricant flows out from the interior of the device to the gap between the hollow input shaft 126 and the inner peripheral edge section 117a of the attachment flange. Because the lubricant is sealed by the labyrinth seal 150, the lubricant is prevented from leaking to the exterior of the device. Additionally, because the downstream-side gap portions among the gap portions 151a to 151e constituting the labyrinth seal 150 are narrower than the upstream-side gap portions, lubricant that has penetrated the upstream-side gap portions is efficaciously prevented from flowing into the downstream-side gap portions. Furthermore, because the gap portions 151a to 151e are regulated by the oil-repellent surfaces, lubricant that has penetrated the labyrinth seal 150 is efficaciously prevented from flowing out toward the exterior of the device. Moreover, lubricant flowing into the labyrinth seal 150 is repelled by the oil-repellent surface formed on the outer peripheral surface portion 126d on the shaft end of the hollow input shaft 126, and deforms into spheroidal grains just before penetrating the gap portion 151a of the labyrinth seal 150. Furthermore, because the axial-direction gap dimensions of the gap portion 151a are smaller than the diameter of the spheroidal lubricant grains thus formed, the flow of the lubricant into the gap portion 151a is suppressed.

Thus, the oil-repelling effect produced by the upstream-side oil-repellent surface of the labyrinth seal 150, the sealing effect produced by the labyrinth seal 150, and the oil-repelling effect produced by the oil-repellent surface that regulates the labyrinth seal 150 make it possible to reliably prevent the lubricant from leaking to the exterior of the device.

(Lubricant Sealing Structure at Site 2D)

Figure 2D:
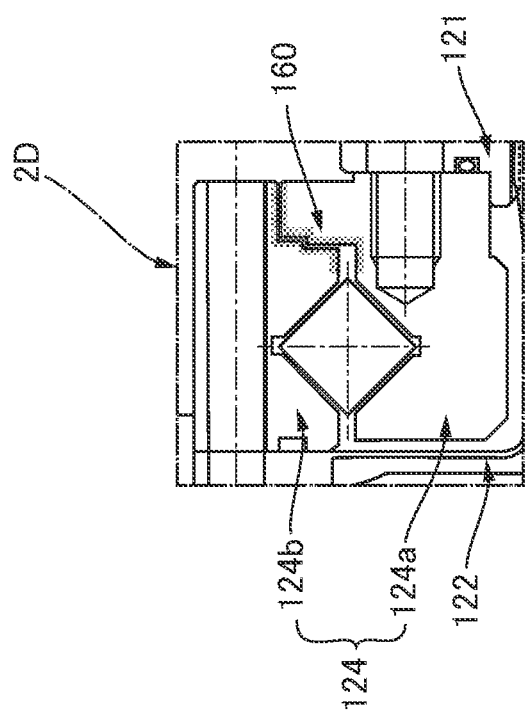
FIG. 2D is an illustrative diagram of a site 2D where the lubricant sealing structure is incorporated into the actuator shown in FIG. 2A.

FIG. 2D is an illustrative diagram of the site of the lubricant sealing structure between the outer race 124a and the inner race 124b of the cross-roller bearing 124. The site 2D of the lubricant sealing structure provided with the labyrinth seal 160 is disposed at a portion of the cross-roller bearing 124 that supports the externally toothed gear 122 and the internally toothed gear 121 in a state that allows relative rotation. Specifically, the lubricant sealing structure is disposed in order to seal a gap portion between the outer race 124a and the inner race 124b of the cross-roller bearing 124. This lubricant sealing structure is substantially identical to the lubricant sealing structure in which the labyrinth seal 40 is used, which is shown in FIG. 1D within embodiment 1.

Therefore, no specific description thereof is given here.

The invention claimed is:

1. A lubricant sealing structure which prevents lubricant from leaking out, from an interior of a device provided with a first member and a second member that rotate relative to one another about a central axis, through a gap portion between the first and second members, the lubricant sealing structure comprising:
    a labyrinth seal for sealing the gap portion, the labyrinth seal being formed between a first surface portion on a first-member side and a second surface portion on a second-member side, the first and second surface portions facing each other;
    oil-repellent surfaces provided with oil repellency with respect to the lubricant, the oil-repellent surfaces being formed on each of the first and second surface portions; and
    an upstream-side oil-repellent surface provided with oil repellency, the upstream-side oil-repellent surface being formed on at least one of a first upstream-side surface portion and a second upstream-side surface portion, the first upstream-side surface portion being connected to the first surface portion and located on an upstream side in a leaking direction in which the lubricant leaks, and the second upstream-side surface portion being connected to the second surface portion and located on an upstream side in the leaking direction,
    wherein each of the oil-repellent surfaces and the upstream-side oil-repellent surface is provided with surface texturing in which grooves are formed in a prescribed groove array pattern so as to achieve oil repellency;
    the grooves are provided with a groove width and a groove depth so as to achieve oil repellency; and
    the groove array pattern is such that the grooves are arrayed at spacings so as to achieve oil repellency.

2. The lubricant sealing structure according to claim 1, wherein
    the groove array pattern is at least one of the following array patterns:
    an array pattern in which the grooves extend, at the spacings, in a straight line, curve, or undulating form in a direction of the central axis of the device;
    an array pattern in which the grooves extend, at the spacings, in a straight line, curve, or undulating form in a circumferential direction centered on the central axis;

an array pattern in which the grooves extend, at the spacings, in a straight line, curve, or undulating form in a direction inclined relative to the direction of the central axis;

an array pattern in which the grooves extend in a spiral at the spacings; and an array pattern in which the grooves are formed in a mesh at the spacings.

3. The lubricant sealing structure according to claim 1, wherein the labyrinth seal is provided with a first gap portion having a first gap dimension; and, the first gap portion is formed with an oil reservoir having a second gap dimension that is larger than the first gap dimension, the oil reservoir being positioned at an intermediate section of the first gap portion in the leaking direction.

4. The lubricant sealing structure according to claim 3, wherein an oil absorber composed of porous material is mounted in the oil reservoir.

5. The lubricant sealing structure according to claim 3, wherein an oleophilic surface provided with oleophilic properties with respect to the lubricant is formed on a section of the first surface portion and a section of the second surface portion, the sections of the first and second surface portions being sections forming the oil reservoir.

6. The lubricant sealing structure according to claim 1, wherein the labyrinth seal is provided with a first gap portion; and at least a part of the first gap portion is a gap portion having a gap dimension that gradually decreases toward the leaking direction.

7. The lubricant sealing structure according to claim 1, wherein the grooves are fine grooves.

8. A strain wave gearing comprising:
an input shaft;
a wave gear mechanism that reduces in speed of a rotation of the input shaft and outputs a reduced speed rotation;
a device housing supporting the input shaft in a rotatable manner via a bearing;
the lubricant sealing structure according to claim 1, the lubricant sealing structure being provided to prevent a lubricant from leaking out from an interior of a device through a gap portion, the gap portion being formed between the device housing which is the first member and the input shaft which is the second member.

9. An actuator comprising:
a motor;
a strain wave gearing provided with an input shaft coaxially linked to the motor, a wave gear reduction mechanism that reduces rotation of the input shaft, and an output shaft to outputs reduced rotation; and
the lubricant sealing structure according to claim 1, the lubricant sealing structure being provided to prevent a lubricant from leaking out from an interior of the strain wave gearing through a gap portion, the gap portion being formed between the output shaft which is the first member and the input shaft which is the second member.

10. An actuator comprising:
a motor;
a strain wave gearing that is coaxially mounted to an attachment flange provided on a front end of the motor;
a motor shaft that penetrates the attachment flange to extend into the strain wave gearing;
an input shaft that is coaxially linked to an end of the motor shaft in the strain wave gearing; and
the lubricant sealing structure according to claim 1, the lubricant sealing structure being provided to prevent a lubricant from leaking from the strain wave gearing to an interior of the motor through a gap portion, the gap portion being formed between the attachment flange which is the first member and the input shaft which is the second member.

* * * * *